US009048676B2

(12) United States Patent
Tsuji et al.

(10) Patent No.: US 9,048,676 B2
(45) Date of Patent: Jun. 2, 2015

(54) CHARGING CIRCUIT AND CHARGING METHOD

(75) Inventors: Takahiro Tsuji, Osaka (JP); Keiichi Ashida, Amagasaki (JP)

(73) Assignee: RICOH ELECTRONIC DEVICES CO., LTD., Osaka (JP)

( * ) Notice: Subject to any disclaimer, the term of this patent is extended or adjusted under 35 U.S.C. 154(b) by 379 days.

(21) Appl. No.: 12/903,644

(22) Filed: Oct. 13, 2010

(65) Prior Publication Data

US 2011/0095729 A1   Apr. 28, 2011

(30) Foreign Application Priority Data

Oct. 27, 2009   (JP) .................................. 2009-246690

(51) Int. Cl.
*H02J 7/04* (2006.01)
*H02J 7/00* (2006.01)

(52) U.S. Cl.
CPC ..................................... *H02J 7/0068* (2013.01)

(58) Field of Classification Search
CPC ....................................................... H02J 7/0055
USPC ......................................................... 320/162
See application file for complete search history.

(56) References Cited

U.S. PATENT DOCUMENTS

| 5,751,133 | A * | 5/1998 | Sato et al. ...................... 320/101 |
| 7,989,981 | B2 * | 8/2011 | Zhang ............................. 307/66 |
| 2006/0139002 | A1 * | 6/2006 | Zemke et al. .................. 320/128 |
| 2008/0231117 | A1 * | 9/2008 | Bucur et al. .................... 307/48 |

FOREIGN PATENT DOCUMENTS

| JP | 7-143687 | 6/1995 |
| JP | 10-275036 | 10/1998 |
| JP | 2000-116014 | 4/2000 |
| JP | 2002-78231 | 3/2002 |
| JP | 2003-244854 | 8/2003 |
| JP | 2006-5979 | 1/2006 |
| JP | 2006-191796 | 7/2006 |
| JP | 2007-60778 | 3/2007 |

OTHER PUBLICATIONS

Japanese official action dated Dec. 10, 2013 in corresponding Japanese patent application No. 2009-246690.

* cited by examiner

*Primary Examiner* — Edward Tso
*Assistant Examiner* — Johali Torres Ruiz
(74) *Attorney, Agent, or Firm* — Cooper & Dunham LLP

(57) ABSTRACT

A charging circuit that simultaneously charges a battery with an electrical current supplied from an external power source and supplies the electrical current supplied from the external power source to a load includes a power supply circuit to supply an electrical current from the battery to the load when a load current required by the load is greater than a maximum supply current of the external power source, a detector to detect a voltage of the battery, and a controller to control power supply to the load as well as charging the battery. When the detected voltage of the battery is lower than the predetermined threshold, the controller stops supplying the electrical current from the battery to the load and charges the battery with the electrical current supplied from the external power source.

12 Claims, 2 Drawing Sheets

CHARGING CIRCUIT AND CHARGING METHOD

CROSS-REFERENCE TO RELATED APPLICATIONS

This application claims priority from Japanese Patent Application No. 2009-246690, filed on Oct. 27, 2009 in the Japan Patent Office, which is hereby incorporated by reference herein in its entirety.

BACKGROUND OF THE INVENTION

1. Field of the Invention

The present invention generally relates to a charging circuit and a charging method used for electronic equipment such as mobile phones, digital cameras, electronic personal organizers, and the like.

2. Description of the Background Art

At present, universal serial bus (USB) host devices are widely used as power sources for loads such as mobile phones. As USB host devices generally have a maximum supply electrical current that the USB host device can supply, it is possible that the USB host device fails to supply electricity if the load connected thereto requires a greater amount of electrical current (hereinafter simply "current") than the maximum supply electrical current.

To solve this problem, several approaches described below have been proposed.

For example, JP-2006-191796-A proposes a current control circuit like that shown in FIG. 2 for controlling electrical current supplied from a power source having a maximum supply current to the load and a battery.

FIG. 2 is a block diagram illustrating circuitry of a related-art current control circuit 10.

Referring to FIG. 2, the current control circuit 10 includes an input terminal 12 connected to an external power source $V_{BUS}$, a connection terminal 14 connected to a load 40, and a battery connection terminal 16 connected to a battery 50. Additionally, the input terminal 12 is connected to the connection terminal 14 via a current restriction transistor 24 that is controlled by a current restriction controller 22 as well as to the battery connection terminal 16 via a transistor 35 that is controlled by a charge-current input controller 30. Further, when another AC power source is used, the AC power source is connected to the load 40 via a Zener diode 78, and the battery 50 is charged with charge current $I_{BAT}$ by a charge-current output controller 32 via the transistor 34. The current control circuit 12 further includes a comparator 62 connected to the AC power source via resistors 80 and 82 for detecting the presence of the AC power source. For ease of understanding, operation of the current control circuit 10 when the AC power source is not used is described below.

Referring to FIG. 2, when the external power source $V_{BUS}$ is connected to the input terminal 12, the current restriction controller 22 supplies a load current $I_{OUT}$ to the load 40 via the transistor 24 up to a maximum supply current of the external power source $V_{BUS}$. Additionally, the charge-current input controller 30 controls the transistor 35, thereby adjusting the amount of the charge current $I_{BAT}$, to charge the battery 50. To charge the battery 50, the load current $I_{OUT}$ is monitored and the charge current $I_{BAT}$ is reduced so that the sum of the load current $I_{OUT}$ and the charge current $I_{BAT}$ does not exceed the maximum supply current of the external power source $V_{BUS}$. When the load current $I_{OUT}$ required by the load 40 alone is greater than the maximum supply current of the external power source $V_{BUS}$, current is also supplied from the battery 50 via an ideal diode 36 to the load 40 because the external power source $V_{BUS}$ alone cannot supply the required amount of current to the load 40.

Additionally, JP2007-60778-A proposes a charging device that uses an USB host device as an external power source and monitors the voltage of the USB host device. This charging device does not charge the battery when the voltage of the USB host device is lower than a predetermined voltage and charges the battery when the voltage of the USB host device is higher than the predetermined voltage.

However, these approaches have several drawbacks.

For example, in the current control circuit 10 according to the first approach, when the amount of current required by the load 40 is greater than the maximum supply current of the external power source $_{BUS}$ and the battery 50 is insufficiently charged, that is, the voltage of the battery 50 is low, the voltage of the battery 50 drops further if current is supplied from the battery 50 to the load 40. Consequently, the load 40 cannot operate because the voltage at the connection terminal 14 to which the load 40 is connected also drops.

By contrast, the charging device according to the second approach does not monitor the current supplied by the external power source. Accordingly, even if the current from the external power source exceeds the maximum supply current, such as USB standards, of the external power source, the amount of current supplied from the external power source cannot be restricted.

In view of the foregoing, the inventors of the present invention recognize that there is a need for a charging circuit and a charging method that restrict the supply current from the external power source to the load within the maximum supply current of the external power source and can prevent the load from becoming inoperative due to an insufficiently charged battery.

SUMMARY OF THE INVENTION

An illustrative embodiment of the present invention provides a charging circuit that simultaneously charges a battery with an electrical current supplied from an external power source and supplies the electrical current supplied from the external power source to a load.

The charging circuit includes a power supply circuit to supply an electrical current from the battery to the load when a load current required by the load is greater than a maximum supply current of the external power source, a detector to detect a voltage of the battery, and a controller to control power supply to the load as well as charging of the battery. When the detected voltage of the battery is lower than a predetermined threshold, the controller stops supplying the electrical current from the battery to the load and charges the battery with the electrical current supplied from the external power source.

Another illustrative embodiment of the present invention provides a charging method for simultaneously charging a battery with an electrical current supplied from an external power source and supplying the electrical current supplied from the external power source to a load and for supplying an electrical current from the battery to the load when a load current required by the load is greater than a maximum supply current of the external power source.

The charging method includes a step of detecting a voltage of the battery, and a step of stopping supply of the electrical current from the battery to the load and charging the battery with the electrical current supplied from the external power source when the detected voltage of the battery is lower than a predetermined threshold.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
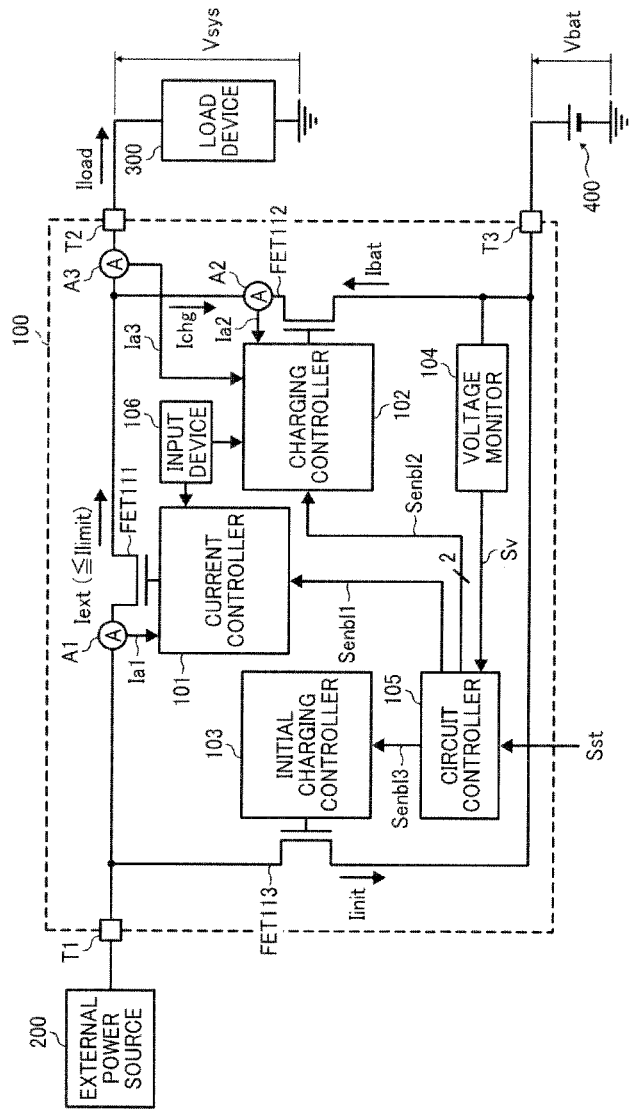
FIG. 1 is a block diagram illustrating circuitry of a charging circuit according to an illustrative embodiment of the present invention.
Figure 2:
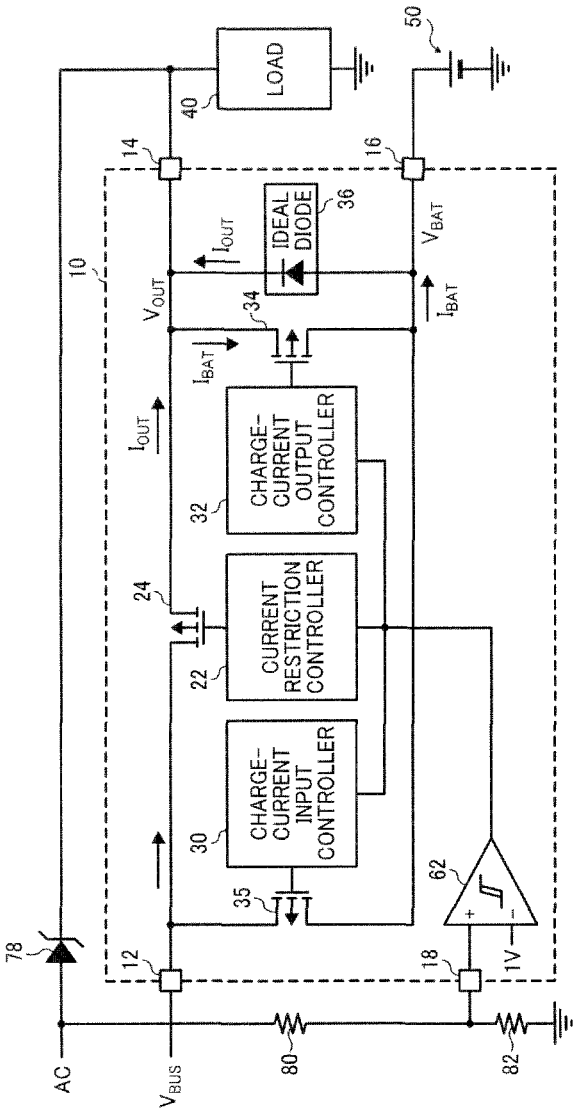
FIG. 2 is a block diagram illustrating circuitry of a related-art current control circuit.

In describing example embodiments illustrated in the drawings, specific terminology is employed for the sake of clarity. However, the disclosure of this patent specification is not intended to be limited to the specific terminology so selected, and it is therefore to be understood that each specific element includes all technical equivalents that operate in a similar manner.

Referring now to the drawings, wherein like reference numerals designate identical or corresponding parts throughout the several views, and particularly to FIG. 1, a charging circuit according to an illustrative embodiment of the present invention is described below.

FIG. 1 is a block diagram illustrating circuitry of a charging circuit 100 according to the present embodiment.

Referring to FIG. 1, the charging circuit 100 includes a current controller 101, a charging controller 102, an initial charging controller 103, a voltage monitor 104, a circuit controller 105, an input device 106, a terminal T1 (hereinafter also "charging terminal T1") connected to an external power source 200, a terminal T2 (hereinafter also "load terminal T2") connected to a load device 300, a battery connection terminal T3, field effect transistors (FETs) 111, 112, and 113, and current detectors A1, A2, and A3.

The charging circuit 100 according to the present embodiment can simultaneously charges a battery 400 with electrical current supplied from the external power source 200, such as an USB host device, and supply power to the load device 300, such as a system circuit, and includes the charging controller 102 and the circuit controller 105. With the charging controller 102 and the circuit controller 105, when a current Iload supplied to the load device 300 is greater than a maximum supply current of the external power source 200, power is supplied also from the battery 400 to the load device 300. The charging circuit 100 further includes the voltage monitor 104 to detect a voltage Vbat of the battery 400, a current controller 101, and the initial charging controller 103. When the voltage Vbat of the battery 400 is smaller than a threshold Vth, the current controller 101 stops supplying a current Ibat to the load device 300 from the battery 400 and charges the battery 400 with a current Iinit supplied from the external power source 200. After charged sufficiently, the battery 400 supplies a current Ibat to the load device 300.

In FIG. 1, the external power source 200 that has a maximum supply current is connected to the charging terminal T1. For example, the maximum supply current of the external power source 200 is 100 mA when an USB host device is used as the external power source 200. The load device 300 such as a system circuit including a central processing unit (CPU) is connected to the load terminal T2, and the battery 400 is connected to the battery connection terminal T3.

With the input device 106 such as a keyboard, users set a limit current Ilimit lower than the maximum supply current of the external power source 200, used in the current controller 101 as well as the charging controller 102. The current detector A1 detects a current Iext that flows from the external power source 200 to the charging circuit 100 and outputs a current value Ia1 to the current controller 101. The current detector A2 detects a current Ichg that flows from the external power source 200 to the battery 400 via the FET 111 and outputs a current value Ia2 to the charging controller 102. The current detector A3 detects a current Iload that flows from the charging circuit 100 to the load device 300 and outputs a current value Ia3 to the charging controller 102.

The current controller 101 operates in response to a control signal Senbl1, output from the circuit controller 105, that indicates high (H) level or low (L) level. When the control signal Senbl1 from the circuit controller 105 is high, the current controller 101 refers to the current value Ia1 output from the current detector A1 and controls the FET 111 so that the current Iext flowing from the external power source 200 to the charging circuit 100 is equal to or smaller than the limit current Ilimit. By contrast, when the control signal Senbl1 from the circuit controller 105 is low, the current controller 101 turns off the FET 111, thereby shutting off the current Iext flowing from the external power source 200 to the charging circuit 100.

The charging controller 102 operates in response to a control signal Senbl2 output from the circuit controller 105. The control signal Senbl2 is transmitted through two signal lines and indicates three levels of HL, LH, and LL. When the control signal Senbl2 from the circuit controller 105 is at HL level, the charging controller 102 turns on the FET 112, thereby causing the current Ibat to flow from the battery 400 to the load device 300. When the control signal Senbl2 from the circuit controller 105 is at LH level, the charging controller 102 refers to the current value Ia2 from the current detector A2 as well as the current value Ia3 from the current detector A3 and controls the FET 111 so that the sum of the current Iload flowing to the load device 300 and the current Ichg flowing from the external power source 200 via the FET 111 to the battery 400 is equal to or smaller than the limit current Ilimit. As a result, the current Ichg is adjusted so that the sum of the current Iload and the current Ichg is equal to or smaller than the limit current Ilimit. Additionally, when the control signal Senbl2 from the circuit controller 105 is at LL level, the charging controller 102 turns off the FET 112, thereby shutting off both the current Ichg flowing from the external power source 200 via the FET 111 to the battery 400 and the current Ibat flowing from the battery 400 to the load device 300.

The initial charging controller 103 operates in response to a control signal Senbl3, output from the circuit controller 105, that indicates H level or L level. When the control signal Senbl3 from the circuit controller 105 is high, the initial charging controller 103 turns on the FET 113, thereby allowing the current Iinit to flow from the external power source 200 to the battery 400 without flowing through both the FET 111 and 112. By contrast, when the control signal Senbl3 from the circuit controller 105 is low, the initial charging controller 103 turns the FET 113 off, thereby shutting off the current Iinit.

The voltage monitor 104 compares a voltage Vbat of the battery 400 with the predetermined threshold voltage Vth, which may be 3 V, for example. The voltage monitor 104 outputs to the circuit controller 105 a comparison signal Sv, which is high when the voltage Vbat is equals to or greater than the threshold voltage Vth and is low when voltage Vbat is lower than the threshold voltage Vth.

A start signal Sst input to the circuit controller 105 from an external device, not shown, indicates H level or L level. The start signal Sst at high level indicates a state in which the load device 300 is starting up, and the amount of current required by it is greater than the limit current Ilimit. The start signal Sst at low level indicates a state in which the load device 300 is not starring up and the amount of current required by it is not greater than the limit current Ilimit. In accordance with the start signal Sst as well as the comparison signal Sv from the voltage monitor 104, the circuit controller 105 outputs the control signals Senbl1, Senbl2, and Senbl3 to the current controller 101, the charging controller 102, and the initial charging controller 103, respectively. It is to be noted that operation of the circuit controller 105 is described in further detail below together with operation of the charging circuit 100.

Next, the operation of the charging circuit 100 is described below.

When the current Iload required by the load device 300 is smaller than the limit current Ilimit, that is, the start signal Sst is low, the charging circuit 100 operates as follows.

In this case, with the current Iext supplied from the external power source 200, the load device 300 is operated and the battery 400 is charged. The circuit controller 105 outputs the H level control signal Senbl1 to the current controller 101, the LH level control signal Senbl2 to the charging controller 102, and the L level control signal Senbl3 to the initial charging controller 103. With this operation, the current controller 101 adjusts the current Iext equal to or smaller than the limit current Ilimit by controlling the FET 111. Additionally, by controlling the FET 112, the charging controller 102 adjusts the current Ichg so that the sum of the load Iload and the current Ichg is equal to or smaller than the limit current Ilimit, and thus charges the battery 400. Additionally, the initial charging controller 103 turns the FET 113 off, thereby shutting off the current Iinit.

Thus, the charging circuit 100 can operate the load device 300 and charge the battery 400 with the current Iext supplied from the external power source 200.

It is to be noted that, although the circuit controller 105 outputs the LH level control signal Senbl2 to the charging controller 102 and the charging controller 102 controls the FET 112 to charge the battery 400 in the description above, the operation is not limited thereto. Alternatively, the circuit controller 105 may output the L level control signal Senbl2 to the charging controller 102 and the charging controller 102 may turn the FET 112 off so as not to charge the battery 400.

Next, operation of the charging circuit 100 when the current Iload required by the load device 300 is greater than the limit current Ilimit and the battery 400 is charged sufficiently, that is, the start signal Sst as well as the comparison signal Sv are high, is described below.

In this case, because a sufficient amount of current cannot be supplied to the load device 300 when only the current Iext from the external power source 200 is supplied to the load device 300, the current Ibat from the battery 400 is supplied to the load device 300 in addition to the current Iext. The circuit controller 105 outputs the H level control signal Senbl1 to the current controller 101, the HL level control signal Senbl2 to the charging controller 102, and the L level control signal Senbl3 to the initial charging controller 103. With this operation, the current controller 101 adjusts the current Iext equal to or smaller than the limit Ilimit by controlling the FET 111, and the charging controller 102 turns the FET 112 on, thereby supplying the Ibat from the battery 400 to the load device 300. As a result, the current Iext as well as the current Ibat are supplied to the load device 300. Additionally, the initial charging controller 103 turns the FET 113 off, thereby shutting off the current Iinit.

Thus, when the current Iload required by the load device 300 is greater than the limit current Ilimit and the battery 400 is charged sufficiently, the charging circuit 100 supplies the current Iext as well as the current Ibat to the load device 300. Therefore, the charging circuit 100 can operate the load device 300 also in this case.

It is to be noted that, although the description above concerns supplying current from both the external power source 200 and the battery 400 for the current Iload required by the load device 300, alternatively, the charging circuit 100 may be controlled not to supply the current Iext from the external power source 200 to the load device 300 when the current Ibat from the battery 400 alone can suffice the current Iload. In such a case, the circuit controller 105 outputs the L level control signal Senbl1 to the current controller 101, and accordingly the current controller 101 turns the FET 111 off, thereby shutting off the current Iext. At that time, the current Ibat equals the current Iload.

Next, operation of the charging circuit 100 when the current Iload required by the load device 300 is greater than the limit current Ilimit and the battery 400 is not charged sufficiently, that is, the start signal Sst is high whereas the comparison signal Sv is low, is described below.

In this case, supplying only the current Iext from the external power source 200 to the load device 300 cannot suffice the current required by the load device 300. Moreover, the battery voltage Vbat is low because the battery 400 is not charged sufficiently. If the current Ibat is supplied to the battery 400 to the load device 300 in this state, the voltage Vbat of the battery 400 drops further. In addition, a voltage Vsys of the load terminal T2 drops due to the on resistance of the FET 112. Thus, the amount of current sufficient for the load current Iload is not supplied to the load device 300. Therefore, in this case, the battery 400 is charged initially, after which the current Iext from the external power source 200 as well as the current Ibat from the battery 400 are supplied to the load device 300.

The circuit controller 105 outputs the L level control signal Senbl1 to the current controller 101, the LL level control signal Senbl2 to the charging controller 102, and the H level control signal Senbl3 to the initial charging controller 103. With this operation, the current controller 101 and the charging controller 102 turn off the FET 111 and 112, respectively, thereby shutting off the current Iext and the current Ibat. Thus, the load device 300 connected to the load terminal T2 is isolated from the charging circuit 100. Additionally, the initial charging controller 103 turns on the FET 113 and charges the battery 400 with the current Iinit. When the battery 400 is charged and the battery voltage Vbat becomes equals to or greater than the threshold voltage Vth, the voltage monitor 104 outputs the H level comparison signal Sv to the circuit controller 105. In response to the H level comparison signal Sv, the circuit controller 105 outputs the L level control signal Senbl3 to the initial charging controller 103. With this operation, the initial charging controller 103 turns off the FET 113 to shut off the current Iinit, thereby stopping charging the battery 400. Subsequently, operations similar to those performed when the start signal Sst and the comparison signal Sv are high are performed.

Thus, because the current Ibat is supplied to the load device 300 from the battery 400 that is sufficiently charged, the charging circuit 100 can supply the current Iext as well as the current Ibat to the load device 300. Therefore, the charging circuit 100 can operate the load device 300 also in this case.

As described above, the charging circuit 100 according to the present embodiment includes the charging controller 102 and the circuit controller 105 and performs charging of a battery 400 as well as supplying power to the load device 300 simultaneously. When the load current Iload supplied to the load device 300 is greater than the maximum supply current of the external power source 200, power is supplied also from the battery 400 to the load device 300. The charging circuit 100 further includes the voltage monitor 104 to detect a voltage Vbat of the battery 400, the current controller 101, and the initial charging controller 103. When the voltage Vbat of the battery 400 is smaller than the threshold Vth, the current controller 101 stops supplying current Ibat from the battery 400 to the load device 300 and charges the battery 400 with the current Iinit supplied from the external power source 200. Subsequently, the current controller 101 causes the battery 400 to supply the current Ibat to the load device 300. The circuit controller 105 and the charging controller 102 supply current from the battery 400 to the load device 300 when the load current Iload supplied to the load device 300 is greater than the maximum supply current of the external power source 200. When the voltage Vbat of the battery 400 is lower than the threshold Vth, the circuit controller 105 and the charging controller 102 together shut off the circuit that connects the battery 400 to the load device 300. Additionally, the circuit controller 105 and the current controller 101 together shut off the circuit that connects the external power source 200 to the load device 300, and the circuit controller 105 and the initial charging controller 103 together turn on the circuit connected directly from the external power source 200 to the battery 400, thereby charging the battery 400 with the current from the external power source 200. Subsequently, the circuit controller 105 and the charging controller 102 turn on both the circuit connected between the battery 400 to the load device 300 and the circuit connected between the external power source 200 and the load device 300. Therefore, the current Ibat from the battery 400 is not supplied to the load device 300 when the battery voltage Vbat is low and is supplied to the load device 300 when battery 400 is charged sufficiently. Therefore, the charging circuit 100 can operate the load device 300 normally.

It is to be noted that, although the circuit controller 105 operates in response to the start signal Sst that indicates whether the load device 300 is starting up, the signal is not limited thereto. For example, the circuit controller 105 may operate in response to a signal that indicates whether the amount of current required by the load device 300 is greater than the limit current Ilimit regardless of whether the load device 300 is starting up. Operation of the circuit controller 105 in such a case is similar to that in the case in which the circuit controller 105 operates in response to the start signal Sst.

As described above, the charging circuit according to the present embodiment includes the detector to detect the voltage of the battery and the controller that stops supplying current from the battery to the load and charges the battery with the current from the power source when the detected voltage is lower than the predetermined threshold. Similarly, the charging method according to the present embodiment includes a step of detecting the voltage of the battery, a step of stopping supply of current from the battery to the load and charging the battery with the current from the power source when the detected voltage is lower than the predetermined threshold. Therefore, the current is not supplied from the battery to the load when the voltage of the battery is low.

Additionally, when the voltage of the battery is low, power is supplied from the battery to the load after the battery is charged, and thus power is supplied to the load from the battery that is charged sufficiently. Thus, the load can operate normally.

Numerous additional modifications and variations are possible in light of the above teachings. It is therefore to be understood that, within the scope of the appended claims, the disclosure of this patent specification may be practiced otherwise than as specifically described herein.

What is claimed is:

1. A charging circuit that simultaneously charges a battery with an electrical current supplied from an external power source and supplies the electrical current supplied from the external power source to a load, the charging circuit comprising:
    a power supply circuit to supply an electrical current from the battery to the load when a load current required by the load is greater than a maximum supply current of the external power source;
    a voltage monitor to detect and monitor a voltage of the battery;
    a first switch connected between the external power source and the load;
    a current controller to control flow through the first switch of a first electrical current supplied by the external power source to the load;
    a second switch connected between the external power source and the battery;
    an initial charging controller to control flow through the second switch of a second electrical current, supplied by the external power source to the battery;
    a third switch connected between the battery and the load;
    a charging controller to control flow through the third switch of a third electrical current supplied by the battery to the load;
    a circuit controller connected to the voltage monitor, the current controller, the initial charging controller and the charging controller;
    a load current detector that is connected to the load, to detect a load electrical current flowing from the charging circuit to the load,
    wherein, when a load current required by the load is greater than a maximum supply current of the external power source and the detected voltage of the battery is lower than a predetermined threshold, the circuit controller causes the current controller and the charging controller to turn off the first and third switch, respectively, and causes the initial charging controller to turn on the second switch in order to have the external power source supply electrical current only to the battery, and
    after the voltage monitor detects that the voltage of the battery is greater than or equal to the predetermined threshold, the circuit controller causes the current controller and the charging controller to turn on the first and third switch, respectively, and causes the initial charging controller to turn off the second switch, in order to supply power from the external power source and battery to the load.

2. The charging circuit according to claim 1, wherein the circuit controller controls the power supply circuit to supply the electrical current from the battery to the load after the battery is charged to a voltage not lower than the predetermined threshold.

3. The charging circuit according to claim 1, wherein, when the detected voltage of the battery is lower than the predetermined threshold, the circuit controller shuts off the load from the external power source as well as from the battery.

4. The charging circuit according to claim 1, wherein
the electrical current is supplied from the external power source to the load via a first electrical path, and supplied from the battery to the load via a second electrical path which is separate from the first electrical path, and when the detected voltage of the battery is lower than the predetermined threshold, the circuit controller shuts off the second electrical path from the battery to the load and shuts off the first electrical path, which is separate from the second electrical path, from the external power source to the load, and charges the battery with the electrical current supplied from the external power source.

5. The charging circuit according to claim 4, wherein
when he charging of the battery with the electrical current supplied from the external power source cause the detected voltage of the battery to be equal to or greater than the predetermined threshold voltage, the circuit controller reopens both of the first and second electrical paths and supplies the electrical current to the load from both the external power source and the battery.

6. The charging circuit according to claim 1, wherein, when the load current required by the load is smaller than a predetermined limited current that is equal to or smaller than the maximum supply current of the external power source and the load is operated and the battery is being charged, the current controller controls the first switch so that the power-source current equal to or smaller than the limited current and the adjusted power-source current is supplied to the load, and the charging controller controls the third switch so that the sum of the load current and the first current is equal to or smaller than the limited current and the adjusted sum of the load current and the first current is supplied to the battery.

7. The charging circuit according to claim 1, wherein, when the load current required by the load is greater than a predetermined limited current that is equal to or smaller than the maximum supply current of the external power source and the battery has already charged, the current controller controls the first switch so that the power-source current is equal to or smaller than the limited current and the adjusted power-source current is supplied to the load, and the charging controls the third switch so that the current from the battery is supplied to the load.

8. The charging circuit according to claim 1, wherein, when the load current required by the load is greater than a predetermined limited current that is equal to or smaller than the maximum supply current of the external power source and the battery is not charged, the charging controller and the current controller turn off the switches to shut off the load from the external power source and charges the battery, and after charging the battery is finished, the charging controller and the current controller controls the switches to supply the power using the power-source current and the current from the battery to the load.

9. A charging method, performed by a charging device including a circuit controller connected to a current controller, an initial charging controller and a charging controller, for simultaneously charging a battery with an electrical current supplied from an external power source and supplying the electrical current supplied from the external power source to a load, and supplying an electrical current from the battery to the load when a load current required by the load is greater than a maximum supply current of the external power source, the charging method comprising:
(a) detecting a voltage of the battery;
(b) turning on, by the current controller, a first switch connected between the external power source and the load to allow a first electrical current to flow from the external power source to the load;
(c) turning off, by the initial charging controller, a second switch connected between the external power source and the battery, to cut off flow of a second electrical current from the external power source to the battery;
(d) turning on, by the charging controller, a third switch connected between the battery and the load, to allow a third electrical current to flow from the battery to the load;
(e) detecting a load electrical current flowing from the charging circuit to the load; and
(f) when the battery voltage detected in (a) is lower than a predetermined threshold and the load current detected in (e) is greater than a maximum supply current of the external power source, causing the current controller and the charging controller to turn off the first and third switch, respectively, and causing the initial charging controller to turn on the second switch in order to have the external power source supply electrical current only to the battery; and
(g) after the battery voltage is greater than or equal to the predetermined threshold, causing the current controller and the charging controller to turn on the first switch and the third switch, respectively, and causing the initial charging controller to turn off the second switch, in order to supply power from the external power source and battery to the load.

10. The charging method according to claim 9, further comprising a step of supplying electrical current from the battery to the load after the battery is charged to a voltage not lower than the predetermined threshold when the detected voltage of the battery is lower than a predetermined threshold.

11. The charging method according to claim 9, further comprising a step of shutting off the load from the external power source as well as from the battery when the detected voltage of the battery is lower than the predetermined threshold.

12. The charging method according to claim 9, further comprising a step of detecting an amount of electrical current flowing from the external power source.

* * * * *